(12) United States Patent
Takada et al.

(10) Patent No.: US 6,428,935 B1
(45) Date of Patent: Aug. 6, 2002

(54) LITHIUM SECONDARY BATTERY

(75) Inventors: Kazunori Takada, Tsukuba; Shigeo Kondo, Hirakata; Ryoji Kanno, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,065

(22) PCT Filed: Nov. 8, 1999

(86) PCT No.: PCT/JP99/06219

§ 371 (c)(1),
(2), (4) Date: Aug. 24, 2000

(87) PCT Pub. No.: WO00/28608

PCT Pub. Date: May 18, 2000

(30) Foreign Application Priority Data

Nov. 10, 1998 (JP) .......................................... 10-318739

(51) Int. Cl.⁷ ................................................ H01M 4/58
(52) U.S. Cl. .............................. 429/231.95; 429/218.1; 429/304; 429/314; 429/322
(58) Field of Search ...................... 429/231.95, 218.1, 429/304, 314, 322

(56) References Cited

U.S. PATENT DOCUMENTS 6,004,697 A * 12/1999 Thackeray et al. ......... 429/223
6,322,929 B1 * 11/2001 Takada et al. .............. 429/314

FOREIGN PATENT DOCUMENTS

| JP | 06333565 A | * 12/1994 | ............ H01M/4/58 |
| JP | 07037617 A | 2/1995 | |
| JP | 08162151 A | 6/1996 | |
| JP | 10294100 A | 11/1998 | |

OTHER PUBLICATIONS

Kanno et al., Structure, ionic conductivity, and phase transformation in new polymorphs of the double chloride spinel, Li2FeCl4, 1988, J. Solid State Chemistry, 72, pp. 363–375.*

(List continued on next page.)

*Primary Examiner*—Patrick Ryan
*Assistant Examiner*—Angela J Martin
(74) *Attorney, Agent, or Firm*—Akin, Gump, Strauss, Hauer & Feld, L.L.P.

(57) ABSTRACT

In a lithium secondary battery comprising a chargeable and dischargeable positive electrode, a chargeable and dischargeable negative electrode and an electrolyte, wherein at least one of the positive electrode and the negative electrode comprises a lithium-containing halide having a spinel structure or spinel analogous structure, the lithium-containing halide having a spinel structure or spinel analogous structure having a high ion bonding property is dissolved into an electrolyte obtained by dissolving a salt into an organic solvent. In the secondary battery of the present invention, since a lithium ion conductive inorganic solid electrolyte is used as an electrolyte, there can be obtained a chargeable and dischargeable lithium battery in which at least one of a positive electrode and a negative electrode comprises a lithium-containing halide having a spinel structure or a spinel analogous structure.

5 Claims, 2 Drawing Sheets

OTHER PUBLICATIONS

K. Takada, S. Kondo, "Inorganic Solid Electrolyte" (in Japanese), *Electrochemistry and Industrial Physical Chemistry*, vol. 65, No. 11, Nov., 1997 (Tokyo), p. 914–919.

C.J.J. van Loon, et al., "Some Chlorides With The Inverse Spinel Structure: $Li_2Cl_4$ (T=Mg,Mn,Fe,Cd).", *Acta Cryst.* B31: 2549–2550 (1975).

R. Kanno, et al., "Structure, Ionic Conductivity, and Phase Transformation in New Polymorphs of the Double Chloride Spinel, $Li_2FeCl_4$", *Journal of Solid State Chemistry*, 72: 363–375 (1988).

R. Kanno, et al. "Synthesis, Structure, Ionic Conductivity, and Phase Transformation of New Double Chloride Spinel, $Li_2CrCl_4$", *Journal of Solid State Chemistry*, 75: 41–51 (1988).

R. Kanno, et al. "Structure Ionic Conductivity And Phase Transformation of Double Chloride Spinels", *Solid State Ionics*, 28–30: 1276–1281, (1988).

R. Kanno, et al. "Ionic Conductivity and Phase Transition of the Bromide Spinels, $Li_{2+2x}M_{1+x}Br_4(M=M_g, M_n)$", *Journal of Electrochemical Society* 133(5): 1052–1056 (1986).

K. Takada, et al. "Inorganic Solid Electrolyte", *Electrochemistry and Industrial Physical Chemistry*, 65(11): No. 11, 914–919 (1997) English Translation.

\* cited by examiner

LITHIUM SECONDARY BATTERY

TECHNICAL FIELD

The present invention relates to a lithium secondary battery using a solid electrolyte, and a halide having a spinel structure or a spinel analogous structure as an active material.

BACKGROUND ART

Recently, with the development of portable appliances such as personal computers and portable telephones, demands for batteries as an electric power source are extremely large. Particularly, since lithium has a small atomic weight and is a material having large ionization energy, a lithium battery is intensively researched in various fields as a battery which can obtain high energy density.

In electrodes of a battery, charge-transfer occurs between an ion moving in an electrolyte and a current flowing in an outer circuit. Therefore, as an active material in a lithium battery, a mixed conductor is preferably used which has lithium ion conductivity together with electron conductivity. One example of such a lithium ion-electron mixed conductor includes various compounds having a spinel structure. A compound of a spinel structure has a three-dimensional diffusion path for a lithium ion and has a preferable structure for transfer of a lithium ion.

Further, when a battery is charged and discharged, the amount of a lithium ion in an active material changes, and with this change, the volume of the active material also changes. When this voluminal change is too large, deteriorations in battery properties are caused such as a deterioration in contact condition between active materials during operation of a battery. $LiCoO_2$ used presently as a positive electrode active material for a lithium secondary battery has a two-dimensional structure in which a lithium ion is present between layers formed by $CoO_2$. When the amount of lithium ion s between these layer s changes, the interlayer distance changes significantly. Whereas, a compound having a spinel structure has a three-dimensional structure, and when it is utilized for an active material of a battery, such a voluminal change concurrent with charging and discharging can be suppressed.

As the compound having a spinel structure that has been investigated as an active material for a lithium battery. there are exemplified oxides such as $LiMn_2O_4$ and $Li_{4/3}Ti_{5/3}O_4$, and sulfides such as $Cu_pTi_2S_4$.

Additionally, as the lithium-containing compound having the same spinel structure, there have been reported halides such as chlorides and bromides. These are, for example, $Li_2MnCl_4$ (C. J. J. van Loon and J. de Jong, Acta Crystallographica B, 24, 1968 (1982)), $Li_2FeCl_4$ (R. Kanno, Y. Takeda, A. Takahashi, O. Yamamoto, R. Suyama, and S. Kume, Journal of Solid State Chemistry, 72, 363 (1988)), $Li_2CrCl_4$ (R. Kanno, Y. Takeda, A. Matsumoto, O. Yamamoto, R. Suyama, and S. Kume, Journal of Solid State Chemistry, 75, 41 (1988)), $Li_2CoCl_4$ (R. Kanno, Y. Takeda, and O. Yamamoto, Solid State Ionics, 28, 1276 (1988)), $Li_{2-2p}Mn_{1+p}Br_4$ (R. Kanno, Y. Takeda, O. Yamamoto, C.Cros, W. Gang, and P. Hagenmuller, Journal of Electrochemical Society, 133, 1052 (1986)), and the like.

However, since these lithium-containing halides having a spinel structure has a high ion bonding property, when an electrolyte prepared by dissolving a supporting electrolyte in a usual organic solvent is used, the halides are easily dissolved in the electrolyte. That is, it was difficult to use the above-mentioned halides as an active material in a lithium battery.

The present invention solves the above-mentioned conventional problems. Specifically, the object of the present invention is to provide a lithium secondary battery using a lithium-containing halide having a spinel structure or a spinel analogous structure.

DISCLOSURE OF THE INVENTION

The present invention relates to a lithium secondary battery comprising a chargeable and dischargeable positive electrode, a chargeable and dischargeable negative electrode and a lithium ion conductive inorganic solid electrolyte, wherein at least one of the positive electrode and negative electrode comprises a lithium-containing halide having a spinel structure or a spinel analogous structure.

The above-mentioned lithium-containing halide is preferably represented by the formula $Li_{2-2p-q}Me_{1+p}X_4$, wherein Me is at least one transition metal element selected from the group consisting of Ti, V, Cr, Mn, Fe, Co, Ni and Cu, X is at least one halogen element selected from the group consisting of F, Cl, Br and I, and $0 \leq p \leq 0.5$ and $0 \leq q \leq 2-2p$.

The above-described lithium-containing halide is further preferably represented by $Li_2MeX_4$, wherein Me is Fe, Mn or Co.

The above-described lithium ion conductive inorganic solid electrolyte is preferably a sulfide-based lithium ion conductive inorganic solid electrolyte.

The above-described lithium ion conductive inorganic solid electrolyte is preferably a silicon-containing sulfide-based lithium ion conductive inorganic solid electrolyte and preferably contains oxygen in an amount of 5 to 70 mol per 100 mol of silicon.

By use of a lithium ion conductive inorganic solid electrolyte as an electrolyte, there can be obtained a rechargeable lithium battery using as an active material a lithium-containing halide having a spinel structure or a spinel analogous structure.

BEST MODES FOR CARRYING OUT THE INVENTION

The present invention is a lithium secondary battery constituted by a lithium ion conductive inorganic solid electrolyte, and an electrode comprising as an active material a lithium-containing halide having a spinel structure or a spinel analogous structure.

In an inorganic solid electrolyte, only one kind of ion is transmitted. Namely, in a lithium ion conductive inorganic solid electrolyte, only a lithium ion moves. Therefore, also when a lithium-containing halide with a high ion bonding property is used as an active material, the structure of the halide is kept and a rechargeable lithium battery can be manufactured.

Meanwhile, an organic solvent electrolyte used in a usual lithium battery, or a solid polymer electrolyte even if it is a solid electrolyte, does not have such ion selectivity. For example, when a solid polymer electrolyte is used, dissolution of a lithium-containing halide scarcely occurs only if the electrolyte is in contact with the halide as the active material. However, during operation of a battery, also an ion of the halide moves in the electrolyte, and as a result, the structure of the lithium-containing halide can not be kept. Namely, it is difficult to manufacture a rechargeable lithium secondary battery.

As the lithium-containing halide in the present invention, a halide having a spinel structure or a spinel analogous structure which allows excellent diffusion of lithium ions is preferable, and particularly preferable is a halide of tetragonal structure in which the moving rate of a lithium ion is high.

The lithium-containing halide having a spinel structure in accordance with the present invention is represented for example by $AB_2X_4$.

Herein, the spinel structure includes an inverse spinel structure. The spinel analogous structure is a structure wherein, in a skeleton having a spinel structure represented by $AB_2X_4$, an A element or B element is partially deficient or an A element site is partially substituted with a B element site.

In this case, X is a halogen ion, A represents the center position of the tetrahedron carrying halogen ions at the apexes, and B represents the center position of the octahedron carrying halogen ions at the apexes. A is occupied mainly by a lithium ion, and B is occupied by a lithium ion, a transition metal element and the like. As the transition metal element occupying B, transition metal elements which tend to cause change in valency concurrent with charging and discharging of a battery are preferable, and specifically, Ti, V, Cr, Mn, Fe, Co, Ni, Cu and the like are preferable.

As the spinel type lithium-containing halide, there are exemplified chlorides such as $Li_2FeCl_4$ (A is occupied by Li, and B is occupied by Li and Fe in a molar ratio of 1:1), $Li_2CrCl_4$, $Li_2VCl_4$, $Li_2TiCl_4$, $Li_2CoCl_4$ and $Li_2MnCl_4$, bromides such as $Li_2CrBr_4$ and $Li_{2-2p}Mn_{1+p}Br_4$, iodides such as $Li_2CoI_4$, fluorides such as $Li_2NiF_4$, those containing a plurality of halogen ions such as $Li_2MnCl_4$-$Li_2MnBr_4$ solid solution system, as well as other compounds.

As the lithium-containing halide of the spinel analogous structure, there are exemplified $Li_{1.6}Cu_{0.4}MnCl_4$ in which an ion other than a lithium ion is present at the center position of tetrahedron, $Li_2Fe_{1-p}Cd_pCl_4$ in which other kind of element is present at the center position of octahedron, and the like.

The lithium-containing halide in the present invention is synthesized, for example, by mixing $MeX_2$ with LiX and heating the mixture.

The mixing ratio of $MeX_2$ and LiX may be selected according to the composition of the lithium-containing halide to be obtained. For example, if $MeX_2$ and LiX are mixed at 1:2 (molar ratio), $Li_2MeX_4$ having an inverse; spinel structure can be synthesized.

The formal valency of an element (Me) in this halide is 2. When Me has a valency of 2, the lithium-containing halide in the present invention can be generally represented by the formula: $Li_{2-2p}Me_{1+p}X_4$.

Namely, in the method of synthesizing $Li_2MeX_4$ having an inverse spinel structure, if the mixing molar ratio of $MeX_2$ and LiX is from 1:2 to (1+p):(2-2p), $Li_{2-2p}Me_{1+p}X_4$ having a spinel analogous structure is obtained.

Herein, p is in the range of $0 \leq p \leq 0.5$ wherein the ratio of the lithium ion and Me, both occupying B, is from 1:1 to 0:1.

Further, the lithium-containing halide is also represented by the composition: $Li_{2-2p-q}Me_{1+p}X_4$, since it can be oxidized in a lithium battery.

Furthermore, if $MeX_3$ containing a transition metal element having a formal. valency of 3 is used instead of $MeX_2$ as a starting material in the above-mentioned method, a lithium-containing halide represented by $Li_{2-2p-q}Me_{1+p}X_4$ is obtained. Specifically, if q mol among (1+p) mol of $MeX_2$ is substituted by $MeX_3$ in the above-mentioned method for synthesizing $Li_{2-2p}Me_{1+p}X_4$, $Li_{2-2p-q}Me_{1+p}X_4$ is obtained. Also, if Me in $Li_{2-2p-q}Me_{1+p}X_4$ is chemically oxidized, a lithium-containing halide represented by $Li_{2-2p-q}Me_{1+p}X_4$ is obtained.

Any of the above-mentioned lithium-containing halide acts as an active material for a lithium secondary battery.

Therefore, the lithium-containing halide of the present invention can be represented by the formula: $Li_{2-2p-q}Me_{1+p}X_4$, wherein Me is at least one transitionmetal element selected from the group consisting of Ti, V, Cr, Mn, Fe, Co, Ni and Cu, X is at least one halogen element selected from the group consisting of F, Cl, Br and I, and $0 \leq p \leq 0.5$ and $0 \leq q \leq 2-2p$.

As the Me, any one element among Ti, V, Cr, Mn, Fe, Co, Ni and Cu may be used alone, or two or more of them may be used in any combination. In the above-mentioned elements, Fe, Co or Mn is particularly preferable.

As the halogen in the lithium-containing halide of the present invention, fluorine, chlorine, bromine and iodine can be selected. When the halogen is bromine or iodine, electrostatic interaction between these halogen ions and a lithium ion becomes small since polarization of the halogen ion is large. That is, a lithium ion can move relatively easily in these halides, and the moving rate of a lithium ion in these halides becomes large. Consequently, a lithium secondary battery having excellent output current property can be obtained. Whereas, when the halogen is chlorine or fluorine, the ion radius of the halogen ion becomes small and a lithium secondary battery having high capacity can be manufactured.

As the lithium ion conductive inorganic solid electrolyte in the present invention, those having high ion conductivity are preferably used for providing high output of a battery. Among them, a sulfide-based lithium ion conductive inorganic solid electrolyte may advantageously be used. Sulfide-based amorphous (glassy) lithium ion conductive inorganic solid electrolytes such as $Li_2S$—$SiS_2$, $Li_2S$—$B_2S_3$ and $Li_2S$—$P_2S_5$ are suitable since they have high ion conductivity of not less than $10^{-4}$ S/cm.

Further, these sulfide-based lithium ion conductive inorganic solid electrolytes are stable against a lithium-containing halide. For example, when a lithium halide and a sulfide-based lithium ion conductive inorganic solid electrolyte are heated at a high temperature, the lithium halide is incorporated into the structure of the solid electrolyte to form a micro region composed of the lithium halide.

There is no change occurring in the crystal structure of the solid electrolyte or in the micro structure itself of the lithium halide. Therefore, also when these lithium-containing halide and sulfide-based solid electrolyte are mixed, they dot not mutually react to deteriorate their properties.

These sulfide-based lithium ion conductive inorganic solid electrolytes are generally synthesized by melting a mixture of starting materials at a high temperature and quenching the mixture. Among them, $Li_2S$—$SiS_2$ manifests smaller transpiration of starting materials in synthesizing an electrolyte since the vapor pressure of $SiS_2$ is higher as compared with $B_2S_3$ and $P_2S_5$. Accordingly, $Li_2S$—$SiS_2$ is most suitable for industrial mass synthesis.

In $Li_2S$—$SiS_2$-based solid electrolytes, lithium ion conductivity is manifested when $SiS_2$ form an amorphous matrix and to this is added $Li_2S$ as a sulfide for modifying the matrix. Therefore, for manifesting higher ion conductivity, a composition having a higher $Li_2S$ content is preferable. However, when the concentration of $Li_2S$ is too high, the stability of the glass structure (matrix) lowers to the contrary and crystallization occurs, leading to a decrease in ion conductivity. Therefore, it is preferable to mix starting materials at a mixing ratio indicated in the following exemplified method.

One example of the method for synthesizing a sulfide-based lithium ion conductive inorganic solid electrolyte will be illustrated in concrete.

As raw materials, 0.25 to 1 mol, preferably 0.4 to 0.7 mol of $SiS_2$, $B_2S_3$, $P_2S_5$ or the like is mixed with 1 mol of $Li_2S$. This mixture is heated at 700 to 1300° C., preferably 900 to 1100° C. for 1 to 12 hours, preferably 2 to 6 hours to obtain a melt (molten article). Finally, the melt is quenched. As the quenching method, there are listed a method in which the melt is applied to twin rollers to be drawn, and is solidified in a thinly drawn state, and the like. When the heating temperature is higher than 1300° C., $Li_2S$ and $SiS_2$ are thermally decomposed to change their compositions, and when lower than 700° C., the mixture is not melted. Further, when the heating time is more than 12 hours, the composition changes significantly, and when less than 1 hour, the composition is not sufficiently melted and mixed.

Sulfurs in a $Li_2S$—$SiS_2$-based solid electrolyte are classified into a cross linking sulfur represented by the structure $\equiv$Si—S—Si$\equiv$, and a non-cross linking sulfur represented by the structure $\equiv$Si—S$^-$... Li$^+$. When a part of sulfurs in a $Li_2S$—$SiS_2$-based solid electrolyte is substituted with oxygen, oxygen selectively substitutes for the cross linking sulfur, to give a structure in which silicon atoms are connected to cross linking oxygen ($\equiv$Si—O—Si$\equiv$).

Herein, each of "—" and "$\equiv$" represents a bond having a strong covalent bonding property, and "..." represents a bond having a strong ion bonding property. When silicon atoms are bonded via a cross linking oxygen, the bond between silicon atoms becomes stronger and the stability of the glass structure becomes higher, as compared with the case where silicon atoms are bonded via a cross linking sulfur. Consequently, it becomes possible to obtain an amorphous solid electrolyte even if the content of the sulfide modifying the matrix is raised. Then, a sulfide-based lithium ion conductive inorganic solid electrolyte showing high ion conductivity can be obtained.

On the other hand, when the non-cross linking sulfur which contributes to bonding with a lithium ion is substituted by oxygen, the electrostatic attractive force with a lithium ion becomes stronger. Namely, it becomes difficult for a lithium ion to move, and ion conductivity decreases. Therefore, it is preferable that the non-cross linking site is occupied by sulfur.

From the above-described matters, as the sulfide-based inorganic solid electrolyte having lithium ion conductivity, those having a cross linking oxygen bonded to silicon atoms as described above are particularly preferable. Such a sulfide-based lithium ion conductive inorganic solid electrolyte having cross linking oxygen and silicon atoms bonded to the cross linking oxygen is obtained by producing a mixture of lithium sulfide, silicon sulfide and for a oxygen source a lithium oxide such as $Li_2O$ or a lithium oxysalt such as $Li_3PO_4$ or $Li_4SiO_4$, as starting materials, and by melting and quenching the mixture.

For example, in the above-mentioned one example of the method for synthesizing a sulfide-based lithium ion conductive inorganic solid electrolyte, a mixture prepared by mixing $Li_2S$ with $SiS_2$, $B_2S_3$, $P_2S_5$ or the like is allowed to further contain a lithium oxide such as $Li_2O$ or a salt of lithium and an oxoacid such as $Li_3PO_4$ or $Li_4SiO_4$. By this, a sulfide-based lithium ion conductive inorganic solid electrolyte having a cross linking oxygen and silicon atoms bonded to the cross linking oxygen is obtained. Herein, it is preferable that a salt of lithium and an oxoacid is contained in an amount of 0.005 to 0.1 mol, further preferably 0.008 to 0.05 mol per 1 mol of $Li_2S$—$M_xS_y$, wherein M represents Si, B, P or the like.

Further, by controlling the content ratio of oxygen to silicone in the above-mentioned sulfide-based lithium ion conductive inorganic solid electrolyte to 40 to 60 mol per 100 mol of silicon, the amount of the cross linking oxygen bonded to silicon atoms can be made optimum.

The present invention will be further illustrated below using examples.

EXAMPLE 1

In this example, $Li_2FeCl_4$, which is a lithium-containing halide having a spinel structure was used as a positive electrode active material. Further, an amorphous inorganic solid electrolyte represented by 0.01 $Li_3PO_4$-0.63 $Li_2S$-0.36 $SiS_2$ (indicating use of a mixture of 1 mol % of $Li_3PO_4$, 63 mol % of $Li_2S$ and 36 mol % of $SiS_2$, as a starting material) was used as a lithium ion conductive inorganic solid electrolyte, and metallic lithium was used as a negative electrode active material. A lithium secondary battery was constituted as described below, and the properties thereof were evaluated.

$Li_2FeCl_4$ was synthesized by the following method.

As the starting materials, lithium chloride (LiCl) and iron chloride ($FeCl_2$) were used. These were mixed at a molar ratio of 2:1, then, the mixture was molded by press into a pellet, and sealed in a glass tube under a reduced pressure. This glass tube sealing the mixture of starting materials was heated at 500° C. for 3 days. The mixture was then ground in mortar to obtain $Li_2FeCl_4$.

Next, a sulfide-based lithium ion conductive inorganic solid electrolyte was synthesized by the following method.

Lithium phosphate ($Li_3PO_4$), lithium sulfide ($Li_2S$) and silicon sulfide ($SiS_2$) as starting materials were mixed at a molar ratio of 1:63:36, and this mixture of starting materials was put in a crucible made of glassy carbon. This crucible was put into a vertical type furnace, and heated at 950° C. in an argon flow, to make the mixture into the molten state. After heating for 2 hours, the melt was drawn by twin rollers and quenched to obtain a lithium ion conductive inorganic solid electrolyte represented by 0.01 $Li_3PO_4$-0.63 $Li_2S$-0.36 $SiS_2$.

Thus obtained $Li_2FeCl_4$, a solid electrolyte, and fibrous graphite as an electric conducting agent were mixed at a weight ratio of 50:48:2 to obtain appositive electrode material.

As the negative electrode, one obtained by punching a metallic lithium foil (thickness: 0.1 mm) into a size of 9.4 mm Φ was used.

Figure 1:
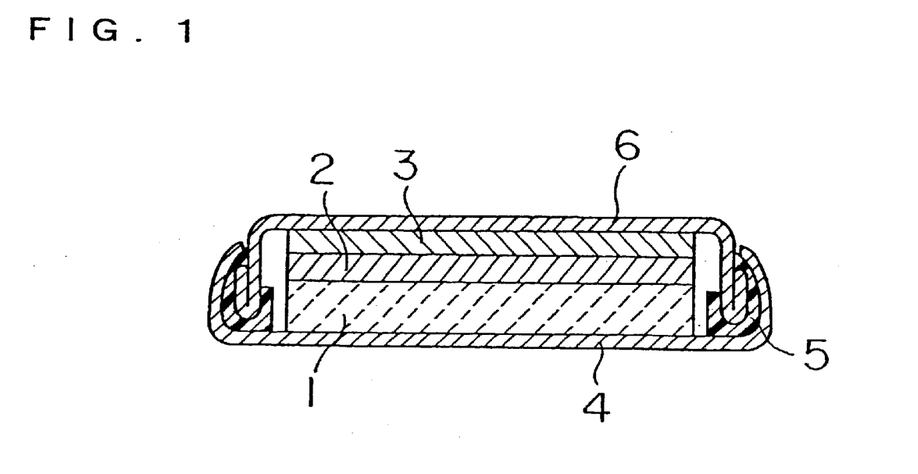
FIG. 1 is a sectional view of a lithium secondary battery in accordance with one example of the present invention.

The sectional view of a lithium secondary battery A in this example is shown in FIG. 1. In FIG. 1, numeral 1 represents a positive electrode, and the above-obtained positive electrode material weighed so that the weight of active materials was 50 mg was used. Numeral 2 represents the prepared lithium ion conductive inorganic solid electrolyte, and the electrolyte 2 was molded by press integrally with the positive electrode 1, followed by pressure-welding a negative electrode which is a metallic lithium foil 3 thereto. This integrally molded pellet was placed into a stainless battery case 4, which was then sealed tightly with a stainless lid 6 via an insulating gasket 5.

Figure 2:
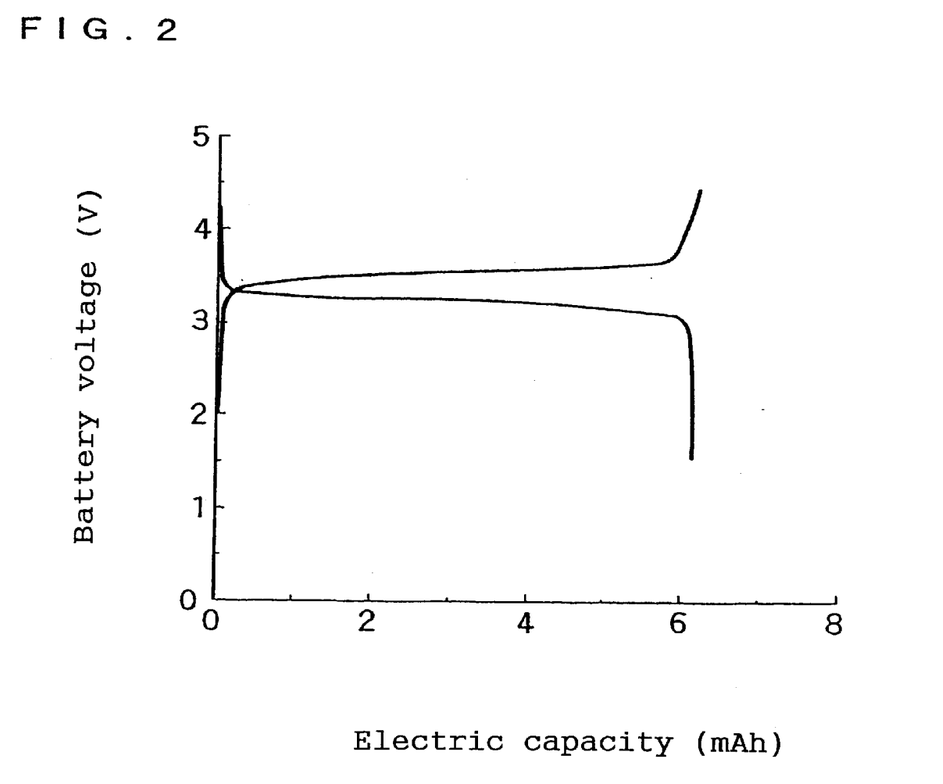
FIG. 2 is a charging and discharging curve graph shown by a lithium secondary battery in accordance with one example of the present invention.

The characteristics of thus manufactured lithium secondary battery were measured by a charging and discharging test at a constant current of 50 $\mu$A and voltages within a range from 1.5 to 4.5 V. The obtained charging and discharging curve is shown in FIG. 2. As apparent from this figure, it is known that the lithium secondary battery manufactured in accordance with the present invention manifests a battery voltage of about 3.5 V and is capable of charging and discharging.

EXAMPLE 2

In this example, a lithium-containing halide $Li_{1.6}Fe_{1.2}Cl_4$ having a spinel analogous structure was used as a positive electrode active material instead of $Li_2FeCl_4$ obtained in Example 1. Further, an amorphous inorganic solid electrolyte represented by 0.01 $Li_3PO_4$-0.63 $Li_2S$-0.36 $SiS_2$ was used as a lithium ion conductive inorganic solid electrolyte, and metallic lithium was used as a negative electrode active material, to constitute a lithium secondary battery, and the properties thereof were measured.

$Li_{1.6}Fe_{1.2}Cl_4$ was synthesized by the following method.

As the starting materials LiCl and $FeCl_2$ were used like in Example 1. These were mixed at a molar ratio of 1.6:1.2, then, the mixture was molded by press into a pellet, and sealed in a glass tube under a reduced pressure. This glass tube sealing the mixture of starting materials was heated at 500° C. for 3 days. The mixture was then ground in mortar to obtain $Li_{1.6}Fe_{1.2}Cl_4$.

A lithium secondary batterys manufactured in the same manner as in Example 1 except that thus obtained $Li_{1.6}Fe_{1.2}Cl_4$ was used as a positive electrode active material, and the charging and discharging properties thereof were measured. As a result, the charging and discharging capacity was lower as compared with that obtained in Example 1, however the battery voltage was about 3.5 V, and it was confirmed to be a chargeable and dischargeable battery.

$Li_{1.6}Fe_{1.2}Cl_4$ used in this example has a lower content of a lithium ion as compared with $Li_2FeCl_4$ used in Example 1. The charging reaction of this lithium secondary battery is a releasing reaction of a lithium ion from $Li_{1.6}Fe_{1.2}Cl_4$. Therefore, the capacity appears to be lowered since $Li_{1.6}Fe_{1.2}Cl_4$ used in this example contains a smaller amount of lithium ions.

EXAMPLE 3

In this example, a lithium-containing halide $Li_{1.6}FeCl_4$ having a spinel analogous structure was used as a positive electrode active material instead of $Li_2FeCl_4$ obtained in Example 1. Further, an amorphous inorganic solid electrolyte represented by 0.01 $Li_3PO_4$-0.63 $Li_2S$-0.36 $SiS_2$ was used as a lithium ion conductive inorganic solid electrolyte, and metallic lithium was used as a negative electrode active material, to constitute a lithium secondary battery, and the characteristics thereof were measured.

$Li_{1.6}FeCl_4$ was synthesized by the following method.

As the starting materials, LiCl, $FeCl_2$ and $FeCl_3$ were used. These were mixed at a molar ratio of 1.6:0.6:0.4, then, the mixture was molded by press into a pellet, and sealed in a glass tube under a reduced pressure. This glass tube sealing the mixture of starting materials was heated at 500° C. for 3 days. The mixture was then ground in mortar to obtain $Li_{1.6}FeCl_4$.

A lithium secondary battery was manufactured in the same manner as in Example 1 except; that thus obtained $L_{1.6}FeCl_4$ was used as a positive electrode active material, and the charging and discharging properties thereof were measured. As a result, the charging and discharging capacity was lower as compared with that obtained in Example 1, however, the battery voltage was about 3.5 V, and it was confirmed to be a chargeable and dischargeable battery.

$Li_{1.6}FeCl_4$ used in this example is alternatively represented by $Li_{1.6}Fe^{2+}_{0.6}Fe^{3+}_{0.4}Cl_4$ using the valency of Fe, and has a lower content of $Fe^{2+}$ as compared with $Li_2FeCl_4$ used in Example 1. The charging reaction of this lithium secondary battery is a reaction of $Fe^{2+} \rightarrow Fe^{3+}$. Therefore, the capacity appears to be lowered since $Li_{1.6}FeCl_4$ used in this example contains a smaller amount of $Fe^{2+}$.

EXAMPLE 4

In this example, a lithium-containing halide $Li_{1.8}FeCl_4$ having a spinel analogous structure was used as a positive electrode active material instead of $Li_2FeCl_4$ obtained in Example 1. Further, an amorphous inorganic solid electrolyte represented by 0.01 $Li_3PO_4$-0.63 $Li_2S$-0.36 $SiS_2$ was used as a lithium ion conductive inorganic solid electrolyte, and metallic lithium was used as a negative electrode active material, to constitute a lithium secondary battery, and the characteristics thereof were measured.

$Li_{1.8}FeCl_4$ was synthesized by the following method.

As the starting materials, LiCl, $FeCl_2$ and $FeCl_3$ were used like in Example 3. These were mixed at a molar ratio of 1.8:0.8:0.2, then, the mixture was molded by press into apellet, and sealed in a glass tube under a reduced pressure. This glass tube sealing the mixture of starting materials was heated at 500° C. for 3 days. The mixture was then ground in mortar to obtain $Li_{1.8}FeCl_4$.

A lithium secondary battery was manufactured in the same manner as in Example 1 except that thus obtained $Li_{1.8}FeCl_4$ was used as a positive electrode active material, and the charging and discharging properties thereof were measured. As a result, the charging and discharging capacity was lower as compared with that obtained in Example 1, however, the battery voltage was about 3.5 V, and it was. confirmed to be a chargeable and dischargeable battery.

$Li_{1.8}FeCl_4$ used in this example is alternatively represented by $Li_{1.8}Fe^{2+}_{0.8}Fe^{3+}_{0.2}Cl_4$ using the valency of Fe, and has a lower content of $Fe^{2+}$ as compared with $Li_2FeCl_4$ used in Example 1. The charging reaction of this lithium secondary battery is a reaction of $Fe^{2+} \rightarrow Fe^{3+}$. Therefore, the capacity appears to be lowered since $Li_{1.8}FeCl_4$ used in this example contains a smaller amount of $Fe^{2+}$.

EXAMPLE 5

In this example, a lithium-containing halide $Li_2MnCl_4$ having a spinel structure was used as a positive electrode active material instead of $Li_2FeCl_4$ obtained in Example 1. A lithium secondary battery was constituted in the same manner as in Example 1 except that an indium-lithium alloy was used as a negative electrode active material, and the characteristics thereof were measured.

$Li_2MnCl_4$ was synthesized by the following method.

As the starting materials, LiCl and $MnCl_2$ were used. These were mixed at a molar ratio of 2:1, then, the mixture was molded by press into a pellet, and sealed in a glass tube under a reduced pressure. This glass tube sealing the mixture of starting materials was heated at 500° C. for 3 days. The mixture was then ground in mortar to obtain $Li_2MnCl_4$.

A lithium secondary battery was manufactured in the same manner as in Example 1 except that thus obtained $Li_2MnCl_4$ was used as a positive electrode active material and a metallic indium foil (thickness: 100 $\mu$m) was used for a negative electrode, and a charging and discharging test was conducted at voltages within a range from 2.0 to 4.0 V. As a result, this lithium secondary battery in accordance with the present invention was capable of charging and discharging between 2.0 and 4.0 V.

EXAMPLE 6

In this example, a lithium secondary battery was constituted in the same manner as in Example 5 except that a lithium-containing halide $Li_2CoCl_4$ having a spinel structure was used as a positive electrode active material, and the characteristics thereof were measured.

$Li_2CoCl_4$ was synthesized in the same manner as in Example 5 except that LiCl and $CoCl_2$ were used as starting materials.

A lithium secondary battery was manufactured in the same manner as in Example 5 using thus obtained $Li_2CoCl_4$ as a positive electrode active material, and a charging and discharging test was conducted at voltages within a range from 2.0 to 4.0 V. As a result, this lithium secondary battery in accordance with the present invention was capable of charging and discharging between 2.0 and 4.0 V as in example 5.

EXAMPLE 7

In this example, a lithium secondary battery was constituted in the same manner as in Example 5 except that a lithium-containing halide $Li_2MnBr_4$ having a spinel structure was used as a positive electrode active material, and the characteristics thereof were measured.

$Li_2MnBr_4$ was synthesized in the same manner as in Example 5 except that LiBr and $MnBr_2$ were used as starting materials.

A lithium secondary battery was manufactured in the same manner as in Example 5 using thus obtained $Li_2MnBr_4$ as a positive electrode active material, and a charging and discharging test was conducted. As a result, this lithium secondary battery in accordance with the present invention was capable of charging and discharging.

EXAMPLE 8

In this example, a lithium secondary battery was constituted in the same manner as in Example 1 except that a sulfide-based lithium ion conductive inorganic solid electrolyte represented by 0.05 $Li_4SiO_4$-0.60 $Li_2S$-0.35 $SiS_2$ was used instead of the amorphous inorganic solid electrolyte represented by 0.01 $Li_3PO_4$-0.63 $Li_2S$-0.36 $SiS_2$ used in Example 1 as an electrolyte, and graphite was used as a negative electrode active material, and the characteristics thereof were measured.

The sulfide-based lithium ion conductive inorganic solid electrolyte represented by 0.05 $Li_4SiO_4$-0.60 $Li_2S$-0.35 $SiS_2$ was synthesized in the same manner as in Example 1 except that a mixture obtained by mixing lithium orthosilicate ($Li_4SiO_4$), lithium sulfide and silicon sulfide at a molar ratio of 5:60:35 was used as the mixture of starting materials.

As the positive electrode material, a mixture obtained by mixing the above-obtained solid electrolyte, $Li_2FeCl_4$ obtained in Example 1 and a fibrous graphite material at a weight ratio of 48:50:2 was used. As the negative electrode material, a mixture obtained by mixing the above-obtained solid electrolyte and graphite at a weight ratio of 1:1 was used.

100 Mg of the positive, electrode material and 50 mg of the negative electrode material were weighed, the solid electrolyte was placed between the positive electrode and negative electrode and they were integrally molded by press and then a lithium secondary battery was manufactured in the same manner as in Example 1, and the charging and discharging properties thereof were measured. As a result, the working voltage of the lithium secondary battery of this example was about 3.4 V, and it was confirmed to be a chargeable and dischargeable battery.

EXAMPLE 9

In this example, a lithium secondary battery was constituted in the same manner as in Example 1 except that a sulfide-based lithium ion conductive inorganic solid electrolyte represented by 0.05 $Li_2O$-0.60 $Li_2S$-0.35 $SiS_2$ was used instead of the amorphous solid electrolyte represented by 0.01 $Li_3PO_4$-0.63 $Li_2S$-0.36 $SiS_2$ used in Example 1 as an electrolyte, and metallic indium was used as a negative electrode active material, and the characteristics thereof were measured.

The sulfide-based lithium ion conductive inorganic solid electrolyte represented by 0.05 $Li_2O$-0.60 $Li_2S$-0.35 $SiS_2$ was synthesized in the same manner as in Example 1 except that a mixture obtained by mixing $Li_2O$, lithium sulfide and silicon sulfide at a molar ratio of 5:60:35 was used as the mixture of starting materials.

As the negative electrode, one that had been obtained by punching an indium foil having a thickness of 0.1 mm into a size of 9.4 mm $\Phi$ was used, and an lithium secondary battery was manufactured in the same manner as in Example 1.

In measuring the charging and discharging properties of this lithium secondary battery, the charging upper limit voltage was set to be 4.0 V and the discharging lower limit voltage was set to be 1.0 V since the negative electrode showed a potential of about 0.6 V based on a metallic lithium electrode. As a result, the working voltage of the lithium secondary battery of this example was about 3.0 V, and it was confirmed to be a chargeable and dischargeable battery.

EXAMPLE 10

In this example, a lithium secondary battery was manufactured in the same manner as in Example 1 except that a sulfide-based lithium ion conductive inorganic solid electrolyte represented by 0.6 $Li_2S$-0.4 $SiS_2$ was used instead of the amorphous solid electrolyte represented by 0.01 $Li_3PO_4$-0.63 $Li_2S$-0.36 $SiS_2$ used in Example 1 as an electrolyte, and the charging and discharging properties thereof were measured. As a result, the lithium secondary battery of this example also showed approximately the same properties as those in Example 1.

EXAMPLE 11

In this example, a lithium secondary battery was manufactured in the same manner as in Example 1 except that a lithium ion conductive amorphous solid electrolyte represented by 0.6 $Li_2S$-0.4 $P_2S_5$ was used instead of the amorphous solid electrolyte represented by 0.01 $Li_3PO_4$-0.63 $Li_2S$-0.36 $SiS_2$ used in Example 1 as an electrolyte, and the charging and discharging properties thereof were measured. As a result, the lithium secondary battery of this example also showed approximately the same properties as those in Example 1.

EXAMPLE 12

In this example, a lithium secondary battery was manufactured in the same manner as in Example 1 except that a lithium ion conductive amorphous solid electrolyte represented by 0.5 $Li_2S$-0.5 $B_2S_3$ was used instead of the amorphous solid electrolyte represented by 0.01 $Li_3PO_4$-0.63 $Li_2S$-0.36 $SiS_2$ used in Example 1 as an electrolyte, and the charging and discharging properties thereof were measured. As a result, the lithium secondary battery of this example also showed approximately the same properties as those in Example 1.

EXAMPLE 13

In this example, a lithium secondary battery was manufactured in the same manner as in Example 1 except that a sulfide-based lithium ion conductive inorganic solid electrolyte represented by 0.30 LiI-0.35 $Li_2S$-0.35 $SiS_2$ was used instead of the amorphous solid electrolyte represented by 0.01 $Li_3PO_4$-0.63 $Li_2S$-0.36 $SiS_2$ used in Example 1 as an electrolyte, and the charging and discharging properties thereof were measured. As a result, the lithium secondary battery of this example also showed approximately the same properties as those in Example 1.

EXAMPLE 14

In this example, a lithium secondary battery was constituted using the lithium-containing chloride having a spinel structure represented by $Li_2FeCl_4$ obtained in Example 1 as a negative electrode active material, an amorphous solid electrolyte represented by 0.01 $Li_3PO_4$-0.63 $Li_2S$-0.36 $SiS_2$ as a lithium ion conductive inorganic solid electrolyte and $LiCoO_2$ as a positive electrode active material, and the properties thereof were measured.

The positive electrode active material $LiCoO_2$ was synthesized by the following method.

As the starting materials, cobalt oxide ($Co_3O_4$) and lithium carbonate ($Li_2CO_3$) were used. These were weighed and mixed at a molar ratio of Co/Li=1, then, the mixture was calcined at 900° C. in atmosphere, to synthesize $LiCoO_2$.

Thus synthesized $LiCoO_2$ was mixed with the solid electrolyte powder at a weight ratio of 6:4, to give a positive electrode material.

As the negative electrode material, the mixture of $Li_2FeCl_4$ obtained in Example 1, the solid electrolyte and fibrous graphite was used.

150 Mg of positive electrode material and 50 mg of negative electrode material thus obtained were weighed, the solid electrolyte was placed between the positive electrode and negative electrode and they were integrally molded by press and a lithium secondary battery was manufactured in the same manner as in Example 1, and the charging and discharging properties thereof were measured. Charging and discharging at voltages within a range from 0 to 3.5 V indicated that this lithium secondary battery was a chargeable and dischargeable battery.

Comparative Example 1

For comparison, a lithium secondary battery was manufactured using a liquid electrolyte which is a non-aqueous solvent electrolyte as an electrolyte, $Li_2FeCl_4$ obtained in Example 1 as a positive electrode active material, and metallic lithium as a negative electrode active material.

As the non-aqueous solvent electrolyte, two kinds of electrolytes were used: one obtained by dissolving lithium hexafluorophosphate ($LiPF_6$) at a concentration of 1 M (mol/liter) into a solvent prepared by mixing ethylene carbonate (EC) and ethyl methyl carbonate (EMC) at a voluminal ratio of 1:1, and one obtained by dissolving $LiPF_6$ at a concentration of 1 M into propylene carbonate (PC).

To $Li_2FeCl_4$ obtained in Example 1 was added 5% by weight of fiberous graphite as a conducting agent and further 5% by weight of a fluorocarbon resin as a binder, and mixed. This mixture was weighed so that the weight of $Li_2FeCl_4$ in the mixture was 50 mg, and filled in a mesh of 9.4 mm Φ made of high chromium stainless steel, to give a positive electrode pellet.

Figure 3:
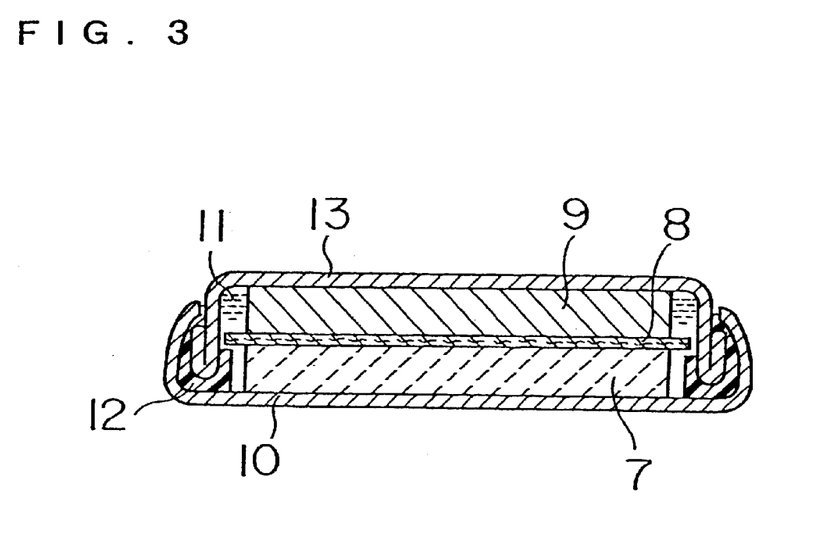
FIG. 3 is a sectional view of a lithium secondary battery in accordance with one comparative example of the present invention.

This positive electrode pellet, a metallic lithium foil having a thickness of 0.34 mm as a negative electrode, and a polypropylene porous film having a thickness of 50 μm as a separator were used to constitute a lithium battery having a cross-section as shown in FIG. 3, using the above-described non-aqueous solvent electrolyte. In FIG. 3, numeral 7 represents the positive electrode pellet, numeral 8 represents the separator, numeral 9 represents the negative electrode, and numeral 10 represents a battery case of stainless steel, and the non-aqueous solvent electrolyte 11 was poured into the case, then, the case was sealed with a cover 13 via a gasket 12.

The charging and discharging properties of thus manufactured lithium secondary battery were evaluated in the same manner as in Example 1. As a result, a charging and discharging efficiency of as low as not more than 70% was shown, and reduction in capacity concurrent with charging and discharging cycle was remarkable. The battery was decomposed to investigate this reason, and deposition of metallic iron was observed on the metallic lithium of the negative electrode, and dissolution of $Li_2FeCl_4$ used as a positive electrode active material into the non-aqueous electrolyte was supposed to be the reason.

In the examples of the present invention, explanations were made only on the cases in which $Li_2FeCl_4$, $Li_2MnCl_4$ and the like are used as the lithium-containing halide having a spinel structure or a spinel analogous structure. However, also when other lithium-containing halides having a spinel structure or a spinel analogous structure are used, excellent lithium secondary batteries can be constituted likewise.

Further, in the examples of the present invention, explanations were made only on the cases in which the lithium-containing halide having a spinel structure or a spinel analogous structure was used for either a positive electrode active material or negative electrode active material. However, since these halides show high reversibility in a lithium secondary battery using a lithium ion conductive inorganic solid electrolyte as an electrolyte, a lithium secondary battery can also be manufactured using them in both of the positive electrode and negative electrode.

Furthermore, in the examples of the present invention, explanations were made only on the cases in which $Li_2S$—$SiS_2$ system and the like were used as the lithium ion conductive inorganic solid electrolyte. However, the same effect was obtained when other solid electrolytes such as $Li_2S$—$Al_2S_3$ and the like were used, when other sulfide-based lithium ion conductive inorganic solid electrolytes such as $LiBO_2$—$Li_2S$—$SiS_2$ and the like were used as the sulfide-based lithium ion conductive inorganic solid electrolyte having a cross-linking oxygen and silicon ions bonded to the cross-linking oxygen ion, further, when oxide-based lithium ion conductive inorganic solid electrolytes were used.

INDUSTRIAL APPLICABILITY

In accordance with the present invention, by use of a lithium ion conductive inorganic solid electrolyte as an electrolyte, a chargeable and dischargeable lithium secondary battery in which an electrode active material is a lithium-containing halide having a spinel structure or a spinel analogous structure can be obtained.

What is claimed is:

1. A lithium secondary battery comprising a chargeable and dischargeable positive electrode, a chargeable and dischargeable negative electrode and a lithium ion conductive inorganic solid electrolyte, wherein at least one of said positive electrode and said negative electrode comprises a lithium-containing halide having a spinel structure or a spinel analogous structure.

2. The lithium secondary battery in accordance with claim 1, wherein said lithium-containing halide is represented by the formula: $Li_{2-2p-q}Me_{1+p}X_4$ where Me is at least one transition metal element selected from the group consisting of Ti, V, Cr, Mn, Fe, Co, Ni and Cu, X is at least one halogen element selected from the group consisting of F, Cl, Br and I, and $0 \leq p \leq 0.5$ and $0 \leq p \leq 2-2p$.

3. The lithium secondary battery in accordance with claim 2, wherein said lithium-containing halide is represented by $Li_2MeX_4$ where Me is Fe, Mn or Co.

4. The lithium secondary battery in accordance with claim 1, wherein said lithium ion conductive inorganic solid electrolyte is a sulfide-based lithium ion conductive inorganic solid electrolyte.

5. The lithium secondary battery in accordance with claim 1, wherein said lithium ion conductive inorganic solid electrolyte is a sulfide-based lithium ion conductive inorganic solid electrolyte containing silicone and oxygen, an amount of said oxygen being 5 to 70 mol per 100 mol of silicon.

* * * * *